Sept. 1, 1931.  H. W. BULLOCK  1,820,902
TRANSMISSION GEARING
Filed Oct. 10, 1929
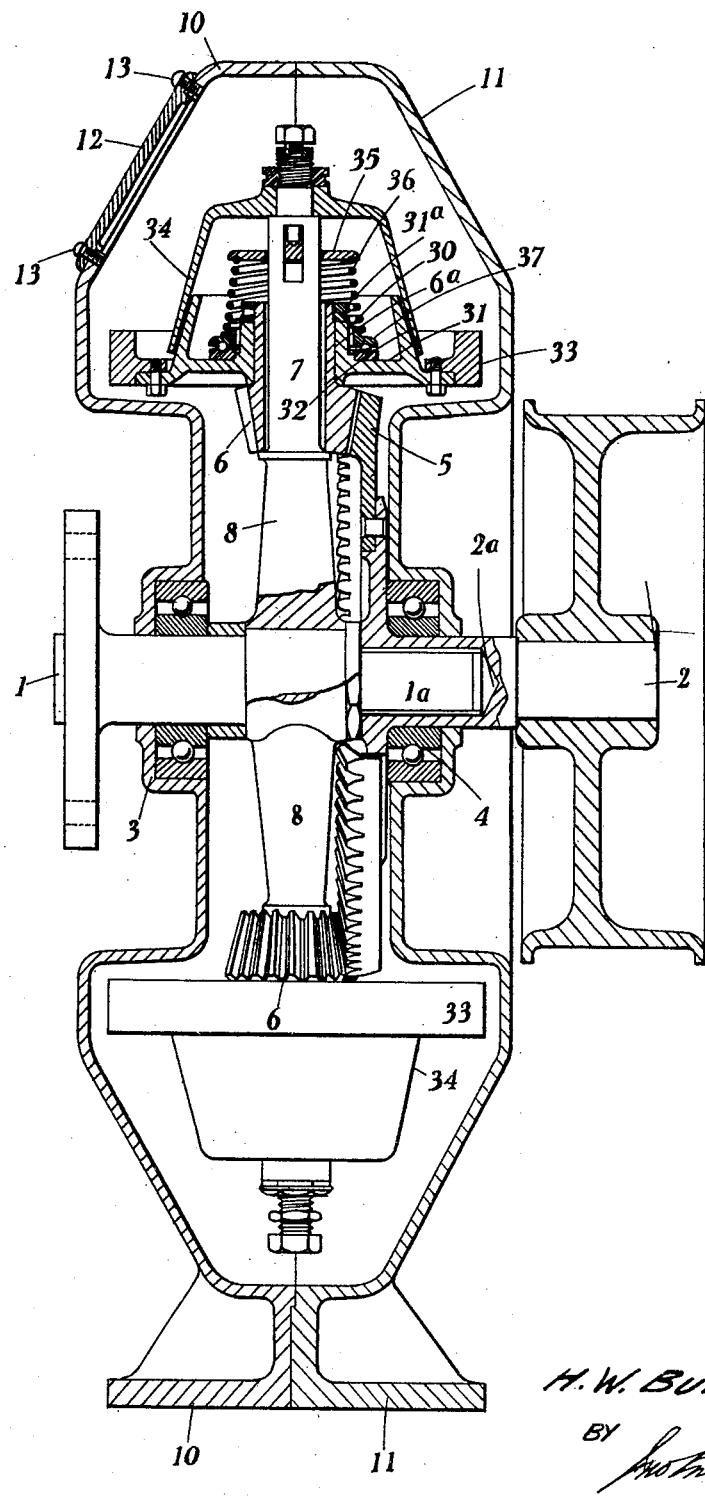
INVENTOR
H. W. BULLOCK
BY
ATTORNEY Patented Sept. 1, 1931

1,820,902

UNITED STATES PATENT OFFICE

HOWARD WILLIAM BULLOCK, OF HARROW, ENGLAND

TRANSMISSION GEARING

Application filed October 10, 1929, Serial No. 398,707, and in Great Britain October 15, 1928.

This invention relates to transmission gearing and has for its main object to provide an improved form of gearing automatically variable with the load by gyroscopic action. Another object is to combine in such gearing automatic clutch apparatus giving a substantially direct drive at high speed where the load conditions are suitable. Preferably the automatic control of the coupling is effected by a member moved centrifugally outwards of a radial spindle carried by the driving member.

In the preferred form of the invention the centrifugal member is coupled or connected with a planet wheel in mesh with a sun wheel on the driven member, the planet wheel at low speeds running loose on the radial spindle but being locked to the radial spindle with a controlled amount of tightness when the centrifugal member is moved outwardly after a predetermined speed has been reached.

One form of the invention is illustrated in the accompanying drawing in which the driving shaft 1 and the driven shaft 2 are represented as mounted in fixed bearings 3 and 4 respectively, and the driving shaft is also spigotted at 1a into a recess 2a of the driven shaft. A bevel wheel 5 is suitably mounted on the driven shaft and engages bevel pinions 6 freely mounted on spindles 7, 7 formed on diametrically opposed arms 8, 8 carried by the shaft 1.

When the driving shaft is driven at low speed (i. e. idling) the bevel pinions 6 move in a simple planetary manner about the bevel wheel 5 carried by the driven shaft 2 which practically remains stationary but even at this speed a tendency to take up the drive is caused by the resistant gyroscopic action caused by reversal of the axes of the pinions 6.

Each planet wheel 6 is provided with a sleeve-like extension 6a on which is mounted an element of a cone clutch. The said element comprises an inner sleeve 30 splined or keyed to the sleeve 6a and held down by a lock nut 31a, the sleeve 30 being integral with an annular plate 31 on which the cone shaft element 32 of the clutch is formed. The periphery of the plate is loaded by an annular weight 33. The radial spindle 7 carries the second element 34 of the cone clutch and interiorly thereof an abutment plate 35 below which is mounted a compression spring 36 resting on a ball race 37 which in turn rests on the plate 31.

Normally when the engine is idling the clutch is disengaged as illustrated in the drawing but as the speed of the driving shaft 1 is increased the clutch element 32 moves outwardly against the pressure of spring 36 to engage the clutch. Before the engagement occurs, power will be transmitted to the driven member owing to the resistance induced by gyroscopic action of the pinions 6, and it is intended that for a considerable range of the lower speeds of the driven member, the power will be transmitted solely by this means, thus providing a very flexible gear ratio to take up the drive. Later, the clutch members will contact and the tightness of the coupling between them will vary generally according to the contrifugal force exerted upon the combined weights of the clutch element and its weighted rim 33, and the planet wheel 6 will therefore be coupled to the spindle 7 with a controlled amount of tightness depending on the speed of the shaft 1, slip occurring when the load on the driven member increases so that the speed of the shaft 1 is reduced. The transmission from the planet wheel 6 is effected through the sun wheel 5 as in the modification described above, and preferably the radial spindles 7 are arranged in one or more pairs as will be readily understood.

The bearings 3, 4 for the driving and driven shafts are carried in a casing formed of two parts 10, 11 preferably divided upon a transverse plane and providing a housing for the whole gear; an access door 12 secured by removable studs or the like 13 enables inspection and adjustment of the clutch and gear to take place.

The gear depends for its action to give an automatic gear transmission, varying with the resistance to the driven member, upon the gyroscopic resistant torque caused by the rotation of the pinions 6 simultaneously with reversal of axis, and for this to be effective it is essential that a relatively large gear ratio—preferably betwen 4:1 and 6:1—shall obtain between the wheel 5 and pinions 6.

It is understood, of course, that the amount of radial movement of which the clutch element 32 is capable is designed to be as low as possible so as not to loosen unduly the engagement between the sun and planet wheels 5, 6.

By suitably designing the rim 33, the utilization of its inertia to transmit power may be used through a wide range of speeds under practical conditions, and the operation of the clutch may then be confined to a final locking engagement at maximum speeds only, or it may even be dispensed with. This ensures a smooth take-up on change of speed of the driving member, and may be used in conjunction with an ordinary gear box or not as found suitable or convenient.

I claim:—

1. Transmission gearing comprising a driving member and a driven member, transverse arms fixed to said driving member, bevel pinions freely revoluble on said transverse arms, bevel teeth on said driven member engaged by said bevel pinions, a clutch member fixed relatively to a transverse arm, and a clutch member fixed relatively to the pinion on said arm, said clutch members being adapted to be forced into engagement at relatively high speed.

2. In a transmission gearing, a driving member, arms fixed transversely to said driving member, bearing spindles on said arms, bevel pinions revoluble on said spindles, and a driven bevel wheel engaged by said bevel pinions, together with clutch members fixed on said arms, clutch members revoluble with said bevel pinions, and spring means holding said respective clutch members apart against centrifugal action tending to bring them into engagement.

3. The combination of transmission gearing automatically variable with the load and including a driving member, an inertia member and planet pinion revoluble on an axis transverse to and revoluble about said driving member, and a driven sun wheel engaged by said planet pinion with automatic centrifugal clutch apparatus adapted substantially to stop the revolution on its axis of said inertia member at predetermined driving speed.

In testimony whereof I affix my signature.

HOWARD WILLIAM BULLOCK.